United States Patent [19]

Ohkouchi et al.

[11] Patent Number: 4,517,607
[45] Date of Patent: May 14, 1985

[54] METHOD OF AND APPARATUS FOR COMPENSATING IMAGE IN IMAGE REPRODUCTION SYSTEM

[75] Inventors: Fusakichi Ohkouchi, Atsugi; Kazuhiro Suzuki, Shimizu, both of Japan

[73] Assignee: Ricoh Company, Ltd., Tokyo, Japan

[21] Appl. No.: 437,781

[22] Filed: Oct. 29, 1982

[30] Foreign Application Priority Data

Nov. 9, 1981 [JP] Japan .................. 56-179272
Nov. 9, 1981 [JP] Japan .................. 56-179273

[51] Int. Cl.$^3$ .............................. H04N 1/40
[52] U.S. Cl. .................. 358/284; 358/280; 382/54
[58] Field of Search .......... 358/284, 280; 382/54

[56] References Cited

U.S. PATENT DOCUMENTS 4,355,337 10/1982 Sekigawa ............... 358/284
4,356,555 10/1982 Ejiri ..................... 358/284
4,360,883 11/1982 Ejiri ..................... 358/284
4,389,677 6/1983 Rushby .................. 358/284

Primary Examiner—Howard W. Britton
Attorney, Agent, or Firm—David G. Alexander

[57] ABSTRACT

An image compensating method and an apparatus for the same which improves the quality of an image to be reproduced by an image reproduction system. A condition of an observed pixel or object pixel is subjected to MTF compensation to provide clear cut boundaries to an image relative to the background. Then, random noise compensation is effected for the condition of the object pixel after the MTF compensation, taking account of conditions of surrounding pixels or MTF-compensated conditions of the surrounding pixels. This removes smear which might appear in a sheet of paper due to random noise. These two kinds of compensation allows an image to be reproduced to a remarkable quality.

14 Claims, 17 Drawing Figures

Fig. 3a
Fig. 3b
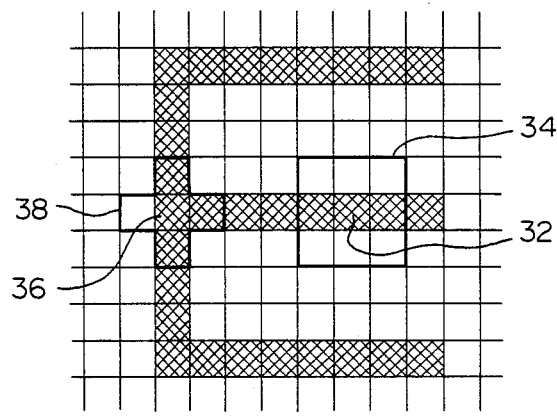
Fig. 3c
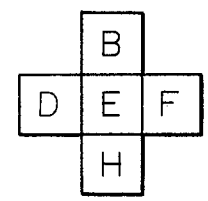
Fig. 4a    Fig. 4b

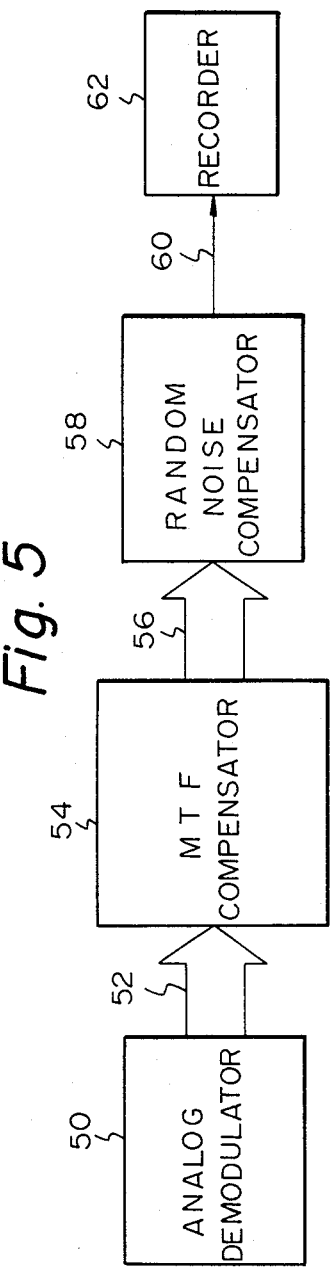
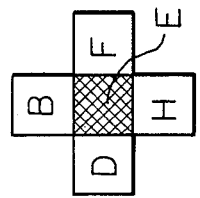
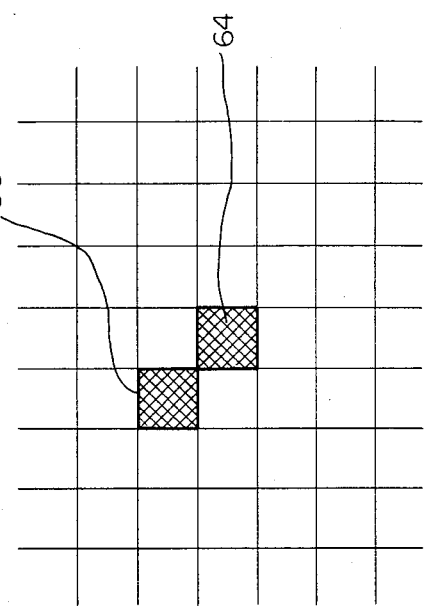

METHOD OF AND APPARATUS FOR COMPENSATING IMAGE IN IMAGE REPRODUCTION SYSTEM

BACKGROUND OF THE INVENTION

The present invention relates to an image reproduction system such as a printer operable as an output device of an analog facsimile transceiver or of a computer system, in which image information is exchanged in the form of analog signals as typified by frequency or amplitude modulated signals. More particularly, the present invention is concerned with a method of and apparatus for compensating images in such an image reproduction system which promote high quality image reproduction.

In communication through wire such as facsimile, major causes for the deterioration to reproduced images generally include group delay, attenuation distortion and signal-to-noise or S/N ratio. Of these causes, the group delay and attenuation distortion appear themselves in a reproduced image as ghost. Use has conventionally been made of a phase equalizer corresponding to 1.5–2 links against the group delay and an attenuation equalizer of 4–8 dB against the attenuation distortion. These means are substantially effective to eliminate the ghost.

The S/N ratio is lowered due mainly to the generation of random noise and this results in smear in a reproduced image. No effective measure is presently available against random noise which is economically applicable to facsimile transceivers and others which are to be produced on quantity basis. In conjunction with the art of satellite communication systems and precision measuring instruments, it has been known to pick up effective signals out of signals buried in noise, that is, signals of low S/N ratios. The S/N ratio may be improved as by employing autocorrelation or by repeatedly processing the same input signal to obtain its average. A drawback inherent in this kind of technique is the need for a disproportionate cost. Hence, it is unsuitable for facsimile and other apparatuses manufactured by quantity production though applicable to extensive ones such as satellite communication systems and precision measuring instruments.

The problem of random noise is particularly severe when the background density is too high to show a sufficient contrast relative to characters printed thereon, as is the case with newspapers for example. The random noise makes the code length longer during coding of an image signal for transmission and, accordingly, increases the time required for the transmission of the signal.

In conventional analog facsimile apparatuses, random noise has been compensated for by making an arrangement such that a reference voltage for the analog-to-digital conversion of a demodulated signal into a binary code is adjustable to a suitable value. This implement still involves a problem that random noise sharply grows to a noticeable degree in response to a fluctuation, particularly deterioration, in S/N ratio during transmission or reception of modulated signals.

Such a problem may be solved by the known MTF (modulation transfer function) compensation. Actually, it has been practiced in an analog facsimile system to carry out the MTF compensation at a transmitter station to compensate an image to be transmitted. However, the MTF compensation at the transmitter station tends to generate random noise against the intention and, rather, makes the reproduced image more illegible.

SUMMARY OF THE INVENTION

In one aspect of the present invention, there is provided an image compensating method for an image reproduction system which compensates an image, which is formed by a plurality of pixels each being provided with one of two different conditions, by compensating a condition of observed one of the pixels or object pixel in accordance with conditions of the pixels adjacent to the object pixel or surrounding pixels. The method comprises a step of supplying the image reproduction system with an image signal containing image information, and a step of compensating an image in response to the input image signal and delivering a compensated signal which indicates a condition of the object pixel.

In another aspect of the present invention, there is provided an image compensating apparatus for an image reproduction system which compensates an image, which is formed by a plurality of pixels each being provided with one of two different conditions, by compensating a condition of observed one of the pixels or object pixel in accordance with conditions of the pixels adjacent to the object pixel or surrounding pixels. The apparatus comprises input means for inputting an image signal into the system which contains image information therein, and compensating means for compensating an image in response to the input image signal and delivering a compensated signal which indicates a condition of the object pixel.

In accordance with the present invention, a condition of an observed pixel or object pixel is subjected to MTF compensation to provide clear cut boundaries to an image relative to the background. Then, random noise compensation is effected for the condition of the object pixel after the MTF compensation, taking account of conditions of surrounding pixels or MTF-compensated conditions of the surrounding pixels. This removes smear which might appear in a sheet of paper due to random noise. These two kinds of compensation allows an image to be reproduced to a remarkable quality.

It is therefore an object of the present invention to improve the quality of reproduced images.

It is another object of the present invention to provide an image compensating method for an image reproduction system which, despite possible use of a poor S/N ratio circuit, promotes high quality image reproduction using means of a simple construction.

It is another object of the present invention to provide an image compensating apparatus for an image reproduction system which enables images to be reproduced to a desirable quality by means of a simple construction.

It is another object of the present invention to provide a generally improved method of and apparatus for compensating images in an image reproduction system.

Other objects, together with the foregoing, are attained in the embodiments described in the following description and illustrated in the accompanying drawing.

BRIEF DESCRIPTION OF THE DRAWING

FIGS. 3a, 3b and 3c are views for describing MTF compensation;

FIGS. 4a and 4b are examples of images reproduced by the apparatus shown in FIG. 2;

FIG. 5 is a block diagram showing another embodiment of the present invention;

FIG. 6 is a block diagram showing how

FIGS. 7a and 7b are views for describing compensation which is employed to free a reproduced image from smear;

FIGS. 8a, 8b and 8c are examples of images reproduced by the apparatus shown in FIG. 5;

DESCRIPTION OF THE PREFERRED EMBODIMENTS

Figure 1:
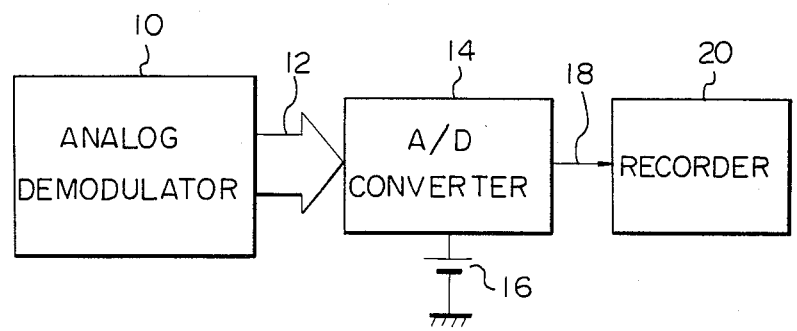
FIG. 1 is a block diagram of prior art means for compensating for random noise.

While the method of and apparatus for compensating images in an image reproduction system of the present invention is susceptible of numerous physical embodiments, depending upon the environment and requirements of use, substantial numbers of the herein shown and described embodiments have been made, tested and used, and all have performed in an eminently satisfactory manner.

To facilitate understanding the invention, a brief reference will be made to a prior art image compensating apparatus, depicted in FIG. 1.

The apparatus includes an analog demodulator 10 which demodulates an analog signal supplied thereto from the outside and which contains image information therein. The demodulator 10 feeds its analog demodulated output to an analog-to-digital or A/D converter 14 through a bus 12. The analog-to-digital converter 14 is supplied with a reference voltage by a power source 16 so that the input modulated signal is converted into a binary code. The output of the analog-to-digital converter 14 is coupled by a line 18 to a recording section 20. Then, the recording section 20 reproduces the original image based on the demodulated signal delivered thereto.

The image compensating apparatus shown in FIG. 1 is designed to eliminate random noise by controlling the voltage at the power source 16 or, stated another way, by so setting the source voltage as to preclude random noise. As previously discussed, however, this type of system involves a problem that random noise rapidly grows in response to a fluctuation, particularly deterioration, in signal-to-noise or S/N ratio during transmission and reception of modulated signals.

In view of the description of the conventional image compensating system, reference is now made to FIGS. 2–10 wherein preferred embodiments of a method and apparatus of the present invention are illustrated.

Figure 2:
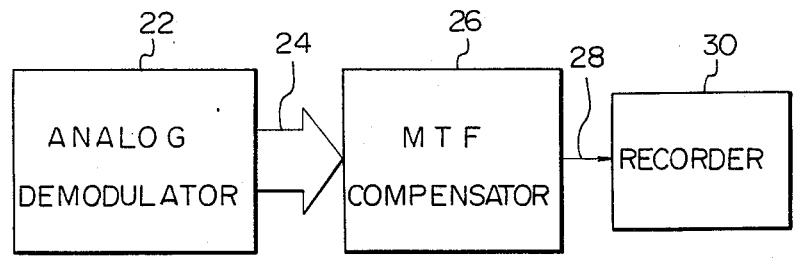
FIG. 2 is a block diagram showing an image compensating apparatus embodying the present invention.

Referring first to FIG. 2, an image compensating apparatus of the present invention comprises an analog demodulator 22 which is supplied from an external facsimile apparatus or the like with a modulated signal which contains image information. The modulated signal is demodulated by the analog demodulator 22 and delivered via a bus 24 to an MTF compensation circuit 26. Based on the input signal, the MTF compensation circuit 26 compensates the image and feeds an MTF compensated signal to a recording section 30 via a line 28. The recording section 30 reproduces the image in response to the MTF compensated signal.

The MTF compensation is carried out in this embodiment at a receiver station instead of a transmitter station, which has conventionally performed it. MTF compensation will be outlined with reference to FIGS. 3a–3c. FIG. 3a shows an exemplary character pattern "E" formed by a plurality of pixels. One of the pixels, such as pixel 32, is observed and, then, observation is made of the condition of each pixel contained in a certain format or range around the pixel 32, such as format 34. The condition may be a binary level such as white or black. Alternatively, pixel 36 and the conditions of pixels adjacent thereto within a format or range 38 may be watched. The pixels in the format 34 may generally be indicated by pixels A–I shown in FIG. 3b, while the pixels in the format 38 may generally be indicated by pixels B, D, E, F and H shown in FIG. 3c. In any case, the picture element E is the object or observed pixel and the pixels A–D and F–I are the surrounding pixels which neighbor the object pixel E. MTF compensation is a procedure for compensating the condition of the object pixel E in accordance with the conditions of the surrounding pixels. The MTF-compensated state of the object pixel E may be expressed by $\hat{E}$, which is:

$$\hat{E} = f(x) \\ = f\{\alpha E - \beta(B + D + F + H)\} \qquad \text{Eq. (1)}$$

where B, D, E, F and H indicate the conditions of pixels B, D, E, F and H before MTF compensation, and $\alpha$ and $\beta$ are predetermined constants and may be $\alpha = 3$ and $\beta = -0.5$, for example. An MTF-compensated signal $\hat{E}$ of the object pixel E is given by Eq. (1) and the recording section 30 reproduces an image on a sheet of paper on the basis of the signal $\hat{E}$. Images reproduced in a newspaper, for example, with and without MTF compensation are indicated in FIGS. 4a and 4b, respectively. A character denoted by the reference numeral 40 in FIG. 4a without MTF compensation is quite illegible though it is originally the alphabet "N" left white in a black background. In contrast, a character 42 in FIG. 4b with MTF compensation is clearly recognizable though it is the exact match of the character 40.

However, the image undergone MTF compensation shown in FIG. 4b gives rise to smearing as at 44 and 46. This is because the background density in a newspaper is high and, therefore, its contrast to the density of characters is low resulting in the generation of random noise. Thus, MTF compensation is successful in accentuating the boundary between white and black areas to improve the overall picture quality, but, at the same time, tends to smear the background area due to the random noise.

For the elimination of random noise, there has been proposed a method which determines whether an object pixel observed is noise or not in accordance with the degree of resemblance between the object pixel and its surrounding pixels, as disclosed in Laid-Open Japanese patent application Ser. No. 27787/1980. For the same purpose, a circuit described in Laid-Open Japanese patent application Ser. No. 152806/1979 is available in which the condition of an object pixel is judged based on the information on the pixels which neighbor the target pixel from vertically and horizontally opposite sides. However, neither one of these means is not a drastic solution to the problem concerned becaused it fails to improve the quality of the whole image though effectively removes random noise, due to the absence of accentuated borders between white and black areas.

Referring to FIG. 5, another embodiment of the present invention is shown which meets both the conflicting demands for the removal of random noise and the accentuation of white-black borders. As shown, an analog demodulator 50 connects to an MTF compensation circuit 54 via a bus 52 as in FIG. 2. The MTF compensation circuit 54 connects via a bus 56 to a random noise compensation circuit 58 which in turn connects via a line 60 to a recording section 62. While the MTF compensation circuit 54 functions to accentuate the borders of an image pattern, the random noise compensation circuit 58 removes smear which might originate from random noise.

Figure 6A:
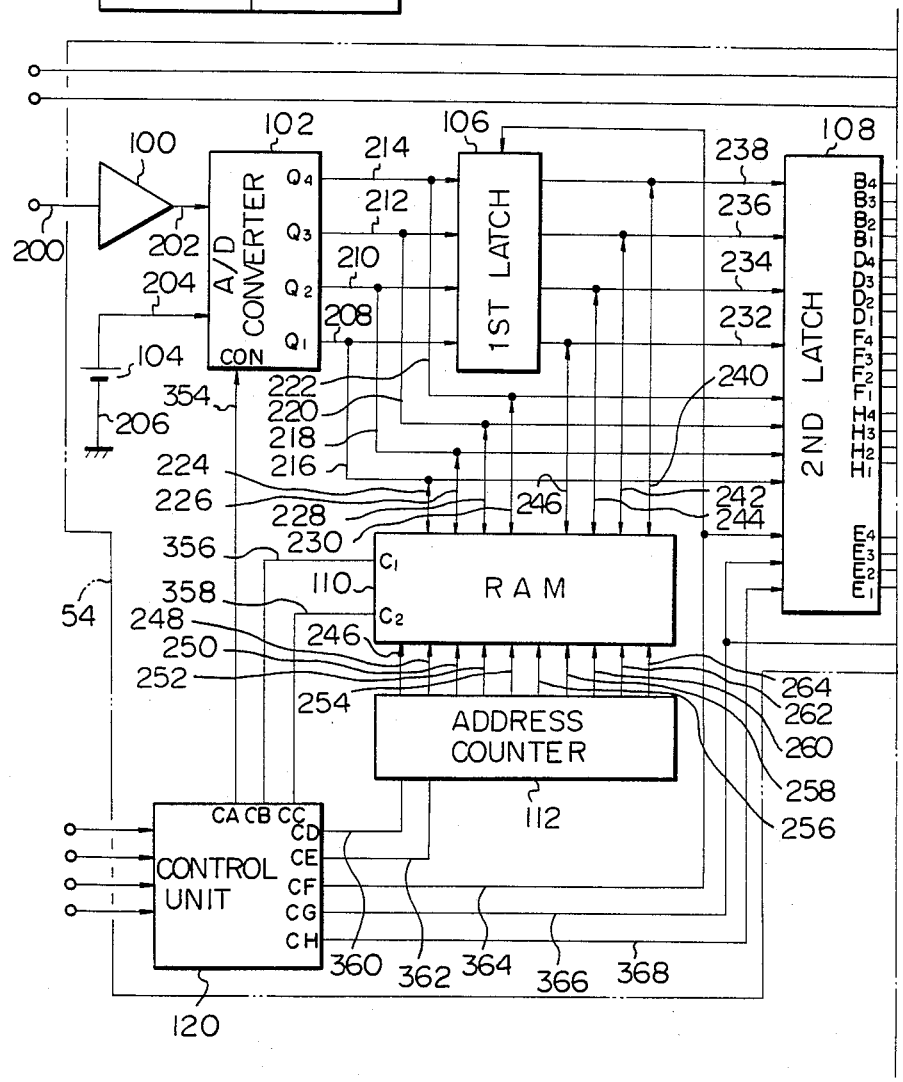
FIGS. 6a and 6b are combined to constitute a circuit diagram showing in detail an essential arrangement of the apparatus indicated in FIG. 5.
Figure 6B:
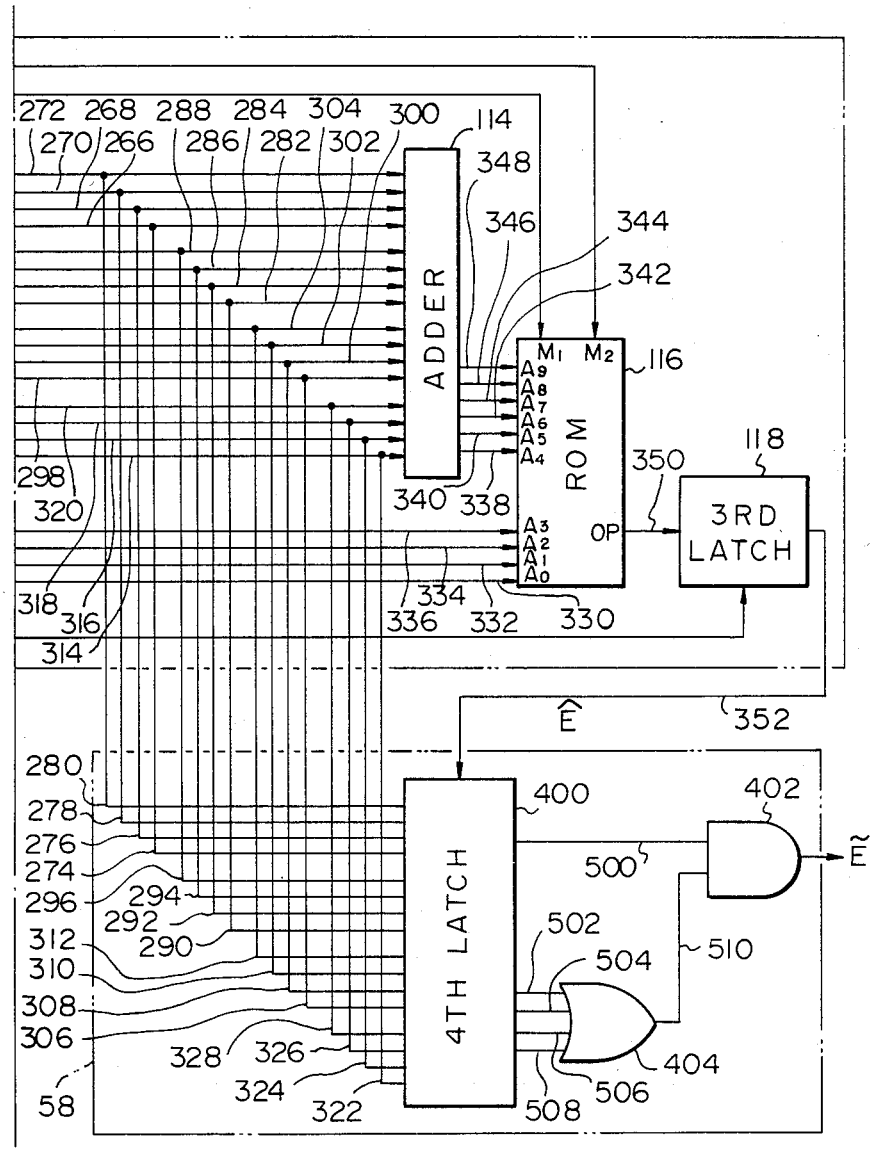

FIG. 6 illustrates the MTF compensation circuit 54 and random noise compensation circuit 58 in greater detail. An amplifier 100 is supplied with demodulated image information signal via a line 200 and, in turn, supplies its modulated output to an analog-to-digital or A/D converter 102 via a line 202. A power source 104 is connected with the A/D converter 102 to give it a reference voltage for the A/D conversion of the demodulated signal. The power source 104 has a positive terminal connecting to the A/D converter 102 via a line 204 and a negative terminal connecting to ground via a line 206. In case where a reference voltage is contained in demodulated signal, the signal may be amplified by the amplifier 100. The demodulated signal is processed by the A/D converter 102 into a 4-bit binary code which appears at output terminals $Q_1$-$Q_4$ of the A/D converter. The output terminal $Q_1$ corresponds to the LSB (least significant bit) and the output terminal $Q_4$ to the MSB (most significant bit). The signal conversion by the A/D converter 102 occurs in accordance with a signal coupled to a terminal CON of the A/D converter. In the illustrated arrangement, the digital output of the A/D converter 102 will be "1111" when a pixel indicated thereby is black and "0000" when it is white. Thus, the 4-bit binary code represents a condition of a pixel in terms of sixteen different tones inclusive of fourteen successive half tones. The output terminals $Q_1$-$Q_4$ are connected with a first latch circuit 106 via lines 208, 210, 212 and 214, respectively. Further, the output terminals $Q_1$-$Q_4$ are connected with a second latch circuit 108 respectively via lines 216, 218, 220 and 222, and with a random access memory or RAM 110 via lines 224, 226, 228 and 230. The first latch circuit 106 is connected with the second latch circuit 108 by lines 232, 234, 236 and 238 and with the RAM 110 by lines 240, 242, 244 and 246. The latch circuits 106 and 108 are individually adapted to temporarily store input data. The RAM 110 has its read/write operation mode controlled by control signals applied to control terminals $C_1$ and $C_2$ thereof. An address counter 112 is connected with the RAM 110 by lines 246, 248, 250, 252, 254, 256, 258, 260, 262 and 264 in order to supply it with a 10-bit binary code for designating an address in which data is to be written or from which data is to be read out. The operation of the address counter 112 is controlled by clock pulses and reset pulses.

The second latch circuit 108 is for the temporary storage of binary codes which represent the conditions of the pixels B, D, E, F and H indicated in FIG. 3c. Of these binary codes, one associated with the pixel B appears at output terminals $B_1$-$B_4$, one associated with the pixel D appears at output terminals $D_1$-$D_4$, one associated with the pixel E appears at output terminals $E_1$-$E_4$, one associated with the pixel F appears at output terminals $F_1$-$F_4$, and one associated with the pixel H appears at output terminal $H_1$-$H_4$. The output terminals $B_1$-$B_4$ respectively connect to an adder 114 via lines 266, 268, 270 and 272 and, also, to a fourth latch circuit 400 via lines 274, 276, 278 and 280. The output terminals $D_1$-$D_4$ respectively connect to the adder 114 via lines 282, 284, 286 and 288 and to the fourth latch circuit 400 via lines 290, 292, 294 and 296. Likewise, the output terminals $F_1$-$F_4$ connect to the adder 114 via lines 298, 300, 302 and 304 and to the fourth latch circuit 400 via lines 306, 308, 310 and 312. The output terminals $H_1$-$H_4$ connect to the adder 114 via lines 314, 316, 318 and 320 and to the fourth latch circuit 400 via lines 322, 324, 326 and 328. Further, the output terminals $E_1$-$E_4$ connect respectively to input terminals $A_0$-$A_3$ of a read only memory or ROM 116 via lines 330, 332, 334 and 336. The adder 114 processes the input signals to obtain $(B+D+F+H)$ indicated in Eq. (1). The summation output is coupled to input terminals $A_4$-$A_9$ of the ROM 116 via lines 338, 340, 342, 344, 346 and 348.

The ROM 116 stores the result of Eq. (1) concerning the pixels B, D, E, F and H. Data coupled to the input terminals $A_0$-$A_9$ of the ROM 116 designates an address from which data is to be read out. It will thus be seen that the ROM 116 is equivalent to an operation unit which performs Eq. (1) and produces the result at its output terminal OP. When the desired density of an image is changed, a mode change-over control signal is supplied to a terminal $M_1$ or $M_2$ of the ROM 116 so that data corresponding to the new image density will be delivered.

The output terminal OP of the ROM 116 connects via a line 350 to a third latch circuit 118 which in turn connects via a line 352 to the fourth latch circuit 400. The third latch circuit 118 is adapted to temporarily store input data.

A control unit 120 controls the operations of the A/D converter 102, first and second latch circuits 106 and 108, RAM 110, address counter 112 and third latch circuit 118. The control unit 120 is supplied with a control signal fed from the outside together with the modulated signal, and with a control signal generated within the apparatus when required. These control signals include clock pulses, sync signals and the like. The control unit 120 is provided with output terminals CA, CB, CC, CD, CE, CF, CG and CH. The output terminal CA is connected with the CON terminal of the A/D converter 102 by a line 354. As previously described, the A/D converter 102 processes input data in response to the signal fed from the CA output terminal to the CON input terminal. The output terminals CB and CC are respectively connected with the control terminals $C_1$ and $C_2$ of the RAM 110 so that the read/write operation mode of the RAM 110 is controlled by the signals coupled to the control terminals $C_1$ and $C_2$. The output terminals CD and CE are connected with the address counter 112 by lines 360 and 362, respectively. Clock pulses for incremental operation of the address counter 112 are fed from the output terminal CD to the address counter 112; reset pulses for resetting the address counter 112 are fed from the output terminal CE. The output terminal CF is connected with the first and second latch circuits 106 and 108 by a line 364 and supply them with clock pulses for the control of data storage. Likewise, the output terminal CG is connected with the second and third latch circuits 108 and 118 by a line 366 and supply them with clock pulses for the control of data storage. Further, the output terminal CH is connected with the second latch circuit 108 by a line 368 so as to supply it with data reset pulses.

The fourth latch circuit 400 stores the MSB's of the respective binary codes which indicate the pixels B, D, F and H while temporarily storing the MTF compensated signal E of the object pixel E given by Eq. (1), i.e. output of the third latch circuit 118. The operation of the latch circuit 400 is controlled by a control unit which is similar to the control unit 120 and, therefore, not shown for simplicity. The latch circuit 400 connects to an AND gate 402 via a line 500 and to an OR gate 404 by lines 502, 504, 506 and 508. The OR gate 404 connects to the AND gate via a line 510. Of the data stored in the latch circuit 400, the MTF compensated signal E is coupled to the AND gate 402 via the line 500 and the MSB's are coupled to the OR gate 404 via the lines 502, 504, 506 and 508. The latch circuit 400, AND gate 402 and OR gate 404 constitute in combination the random noise compensation circuit 58.

The apparatus described above with reference to FIGS. 5 and 6 will be operated as follows. The demodulated signal on the line 200 is amplified by the amplifier 100 and then converted into a digital signal by the A/D converter 102. The digital signal from the A/D converter 102 is stored in the first latch 106 and RAM 110. The data stored in the first latch 106 is also stored in the second latch 108. Additionally stored in the second latch 108 is the data read out from the RAM 110. Thus, the second latch 108 stores binary codes indicative of the conditions of the object pixel E and surrounding pixels B, D, F and H in response to output data of the first latch 106 or that of the RAM 110. These binary codes are supplied to the adder 114 or the ROM 116. The adder 114 gives a sum $(B+D+F+H)$ and delivers the sum to the ROM 116. Based on the input data, the ROM 116 supplies the third latch 118 with the MTF compensated signal $\hat{E}$ given by Eq. (1) and as a 1-bit binary code. The MTF compensated signal $\hat{E}$ is stored in the third latch 118 and in the fourth latch 400 via the third latch 118. The fourth latch 400 is supplied with data from the second latch 108 and stores the MSB's of the binary codes which respectively represent the conditions of the surrounding pixels B, D, F and H. Of the data stored in the latch 400, the MSB's are fed to the OR gate 404 via the lines 502–508. When all the MSB's are "0", the OR gate 404 delivers (logical) "0" level to the AND gate 402; otherwise, it delivers "1" level to the AND gate 402. Thus, when all the MSB's are "0", the output of the AND gate 402 becomes "0" level and, otherwise, the MTF compensated signal $\hat{E}$ stored in the fourth latch 400 is directly coupled from the AND gate 402 to the recording unit 62.

Figures 8A, 8C:
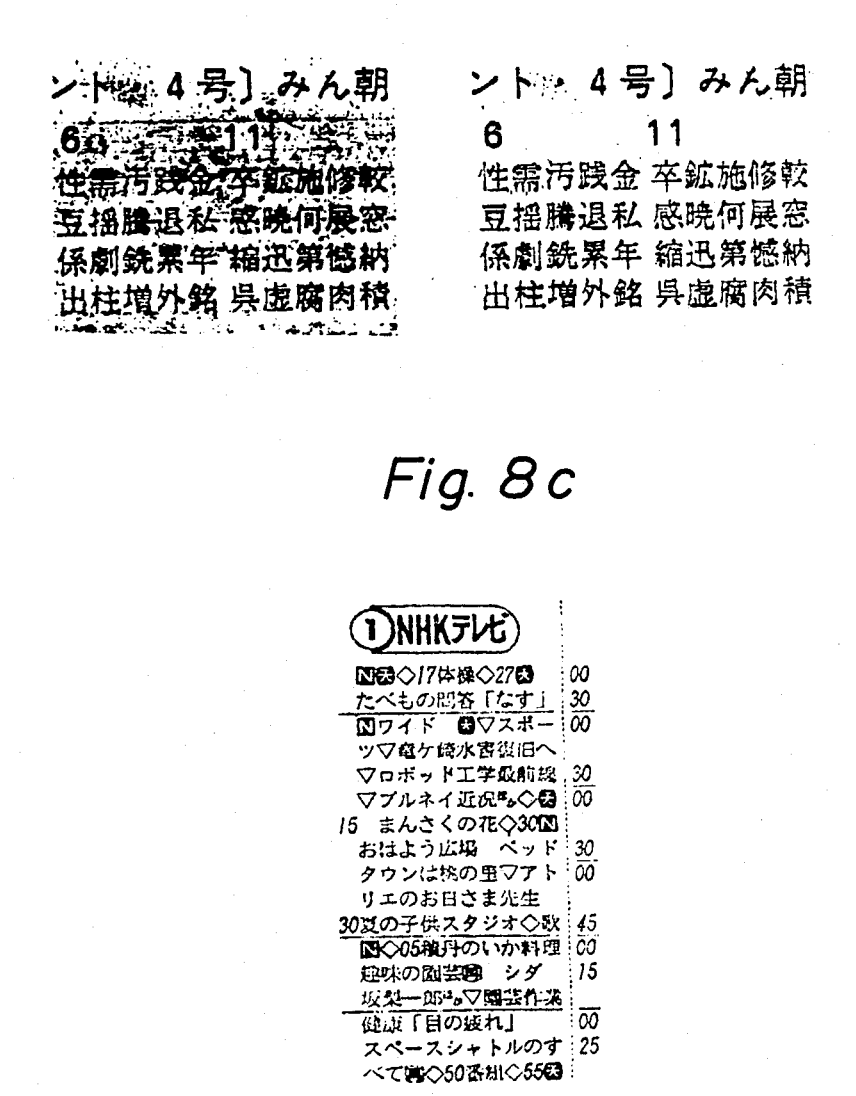

FIG. 7a shows an example of smear appeared in an area which is expected to be white. In detail, pixels 64 and 66 have appeared black due to random noise though they should have appeared white. The format shown in FIG. 7b has the pixel 64 or 66 as the object pixel E in combination with the surrounding pixels B, D, F and H. Binary codes indicating the surrounding pixels B, D, F and H in FIG. 7b are all "0000" and, so, the MSB's are all "0". In the random noise compensation circuit 58, the input and output of the OR gate 404 are both "0" level so that the output of the AND gate 402 is "0" level regardless of the MTF compensated signal $\hat{E}$ associated with the object pixel E. The compensated signal $\tilde{E}=0$ from the AND gate 402 is fed to the recording section 62. In this manner, though the object pixel E was once made black due to random noise, it is corrected to black by the random noise compensation circuit 58 and reproduced on a sheet of paper accordingly. FIGS. 8a and 8b indicate, in a contrastive manner, an image which was not compensated as to random noise and an image which was compensated, respectively. It will be seen that the image shown in FIG. 8b has an accentuated boundary between its black and white areas and does not involve any smear therein. Compensating the image shown in FIG. 4b with the circuit 58 gave the image shown in FIG. 8c which is free from smear 44 or 46.

Figure 9:
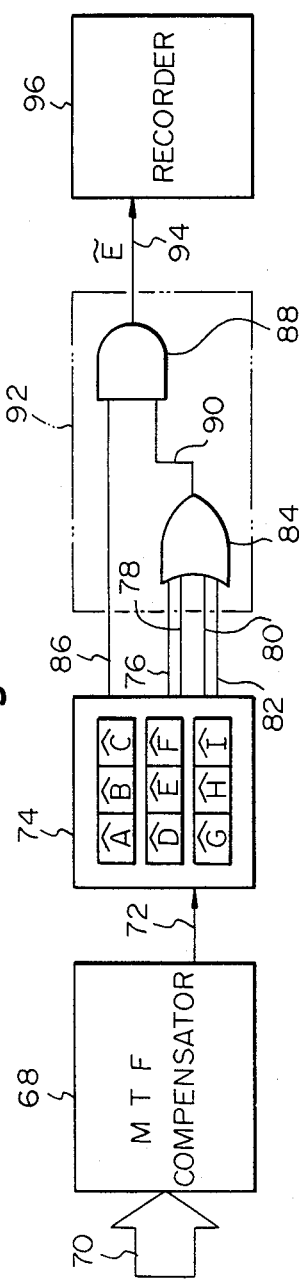
FIG. 9 is a block diagram showing another embodiment of the present invention.

Referring to FIG. 9, another embodiment of the image compensating apparatus of the present invention is shown. An MTF compensation circuit 68 is supplied with a demodulated signal from an analog demodulator (not shown) via a bus 70. The MTF compensation circuit 68, as in the first embodiment, serves to deliver an MTF compensated signal. A buffer memory 74 is connected with the MTF compensation circuit 68 by a line 72 so as to store MTF compensated signals. In detail, the buffer memory 74 store MTF compensated signals $\hat{A}, \hat{B}, \hat{C}, \hat{D}, \hat{E}, \hat{F}, \hat{G}, \hat{H}$ and $\hat{I}$ which respectively represent the conditions of the pixels A, B, C, D, E, F, G, H and I shown in FIG. 3b. The buffer memory 74 connects to an OR gate 84 via lines 76, 78, 80 and 82 and to an AND gate 88 via a line 86. The OR gate 84, in turn, connects to the AND gate 88 via a line 90. The OR gate 84 and AND gate 88 are common to those shown in FIG. 6 and cooperate to make up a random noise compensation circuit 92. Of the data stored in the buffer memory 74, the MTF compensated signals $\hat{B}, \hat{D}, \hat{F}$ and $\hat{H}$ are supplied to the OR gate 84 while the MTF compensated signal $\hat{E}$ is supplied to the AND gate 88. The AND gate 88 connects to a recording section 96 via a line 94.

For the random noise compensation, the circuitry shown in FIG. 9 employs the MTF compensated signals of surrounding pixels, instead of the MSB's of the binary codes which indicate the conditions of the surrounding pixels. When all the MTF compensated signals $\hat{B}, \hat{D}, \hat{F}$ and $\hat{H}$ are "0" level indicating "white", the MTF compensated signal associated with the object pixel E is made "0" level and this is fed to the recording section 96 as a compensated signal $\tilde{E}$. It will be understood that the removal of smear is accomplished in the same way as described with reference to FIGS. 7a and 7b.

Figure 10:
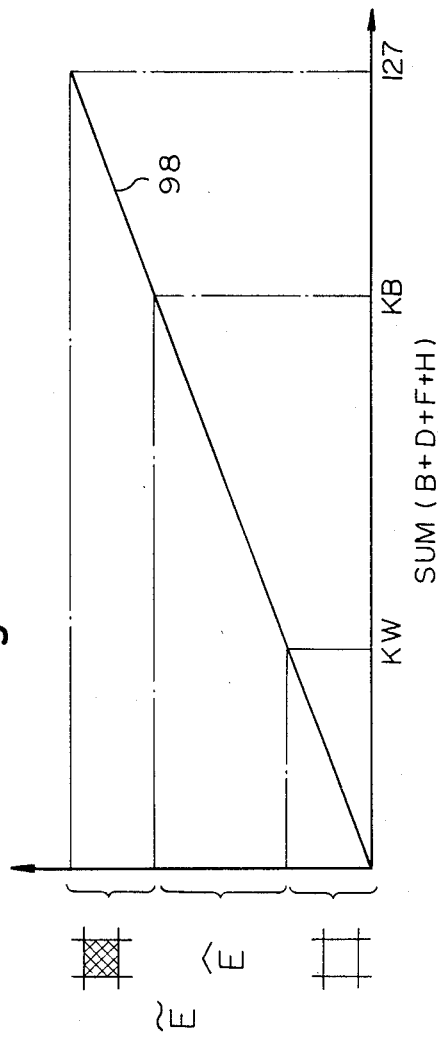
FIG. 10 is a diagram representing another image compensating method of the present invention.

FIG. 10 is a diagram representing still another embodiment of the random noise compensation of the present invention. In FIG. 10, line 98 defines a range of values which the sum of the binary codes indicative of the conditions of the surrounding pixels B, D, F and H can take. The sum has a maximum value of 127 and medium values KW and KB. The sum becomes larger when the conditions of the surrounding pixels B, D, F and H are darker and it becomes smaller when the conditions concerned are lighter. In this embodiment, the object pixel E is subjected to random noise compensation depending on the conditions of its surrounding pixels B, D, F and H. If the sum is smaller than the smaller medium reference value KW, the object pixel E will be determined to be smear and the MTF compensated signal $\hat{E}$ of the object pixel E will be made "0" level or white to provide the compensated signal $\tilde{E}$. If the sum is larger than the medium reference value KW but smaller than the higher medium reference value KB, $\hat{E} = \bar{E}$ will be established. Further, if the sum is larger than the larger reference value KB, the object pixel E will be determined to be white smear in a black background and the MTF compensated signal $\hat{E}$ of the pixel E will be made "1" level or black to provide the compensated signal $\bar{E}$. These relations may be expressed as:

$$\bar{E} = 0 \text{ when } 0 \leq B+D+F+H < KW \quad \text{Eq. (2)}$$

$$\bar{E} = E \text{ when } KW \leq B+D+F+H < KB \quad \text{Eq. (3)}$$

$$\bar{E} = 1 \text{ when } KB \leq B+D+F+H \leq 127 \quad \text{Eq. (4)}$$

The discrimination based on Eqs. (2)–(4) can be effected with ease by, for example, altering the data stored in the ROM 116 shown in FIG. 6. With this embodiment, the image quality can be further improved because not only black smear in a white background but white smear in a black background are eliminated.

In summary, it will be seen that the present invention is successful both in minimizing the influence of random noise and in accentuating the boundary between white and black areas, thereby promoting high quality image reproduction even with a circuit whose S/N ratio is relatively poor. Because the boundary accentuated by MTF compensation and the removal of random noise are coupled to enhance the correlationship of information, needless information is fully knocked off to increase the coding effeciency or coding rate and, therefore, shortens the transmission time. Moreover, because conventional devices are usable for data reading and recording while the circuitry for MTF compensation and isolated point compensation is suitable for large scale integration and can be shared by various devices, an image compensating apparatus can be supplied at low cost.

While the terms "black" and "white" have been used hereinabove considering the ordinary reproduction of images in black in white backgrounds, it will be seen that the present invention is applicable to the reproduction of images in any other color.

Various modifications will become possible for those skilled in the art after receiving the teachings of the present disclosure without departing from the scope thereof. For example, the binary MTF compensated signal $\hat{E}$ or compensated signal $\bar{E}$ may be subjected to digital-to-analog conversion so that an analog image is reproduced by recording means in response to the resulting analog signal. In the embodiment shown in FIGS. 5 or 9, the random noise compensation circuit may be rearranged to be capable of compensating for the white smear in a black background as has been stated with reference to FIG. 10. Though in FIG. 5 the binary code indicating the condition of a pixel has been constituted by four bits, such a number of bits is only illustrative and may be replaced by another. In this regard, the reference values KW and KB and the maximum value in FIG. 10 are variable in conformity with a number of bits which constitutes the binary code. If desired, surrounding pixels A, C, G and I may be watched instead of the surrounding pixels B, D, F and H watched in each of the foregoing embodiments. The circuit arrangement in each of the embodiments may be modified or changed as desired insofar as its expected function is preserved.

What is claimed is:

1. In an image reproduction system, a method of compensating an image, which is formed by a plurality of pixels each being provided with one of two different conditions, by compensating a condition of observed one of the pixels or object pixel in accordance with conditions of the pixels adjacent to the object pixel or surrounding pixels, comprising the steps of:
    (a) supplying the image reproduction system with an image signal containing image information; and
    (b) compensating an image in response to the input image signal and delivering a compensated signal which indicates a condition of the object pixel;
    step (b) comprising the steps of delivering an MTF compensated signal through MTF compensation which accentuates boundary portions of an image in response to the image signal, and carrying out random noise compensation to remove smear from the image in response to the MTF compensated signal and signals indicative of conditions of the surrounding pixels.

2. A method as claimed in claim 1, in which the signals indicative of conditions of the surrounding pixels represent the image signal by binary codes each having a plurality of bits, the random noise compensation being carried out based on signals which are represented by the combinations of desired bits of said signals except the LSB's thereof.

3. A method as claimed in claim 1, in which the signals indicative of conditions of the surrounding pixels are MTF compensated signals.

4. A method as claimed in claim 1, in which a condition of the object pixel is determined by comparing with predetermined indexes a sum of the values represented by the signals which are associated with the surrounding pixels.

5. A method as claimed in claim 1, in which the signals indicative of conditions of the surrounding pixels represent the image signal by binary codes each having a plurality of bits, the random noise compensation being carried out based on the MSB's of said signals associated with the surrounding pixels.

6. A method as claimed in claim 5, in which each of the signals indicative of conditions of the surrounding pixels is provided with four bits.

7. A method as claimed in claim 5 or 6, in which OR of the MSB's of the signals associated with conditions of the surrounding pixels is obtained and, then, AND of the OR and the MTF compensated signal associated with the object pixel is obtained.

8. An image compensating apparatus in an image reproduction system for compensating an image, which is formed by a plurality of pixels each being provided with one of two different conditions, by compensating a condition of observed one of the pixels or object pixel in accordance with conditions of the pixels adjacent to the object pixel or surrounding pixels, comprising:
    input means for inputting an image signal into the system which contains image information therein; and
    compensating means for compensating an image in response to the input image signal and delivering a compensated signal which indicates a condition of the object pixel;
    the compensating means comprising an MTF compensation circuit for delivering an MTF compensated signal by effecting MTF compensation, which accentuates boundary portions of an image in response to the image signal, and a random noise compensation circuit for removing smear from the image in response to the MTF compensated signal and signals indicative of conditions of the surrounding pixels.

9. An apparatus as claimed in claim 8, in which signals indicative of conditions of the surrounding pixels represent the image signal by binary codes each having a plurality of bits, the random noise compensation being carried out based on signals which are represented by the combinations of desired bits of said signals except the LSB's thereof.

10. An apparatus as claimed in claim 8, in which the signals indicative of conditions of the surrounding pixels are MTF compensated signals.

11. An apparatus as claimed in claim 8, in which a condition of the object pixel is determined by comparing with predetermined indexes a sum of the values represented by the signals which are associated with the surrounding pixels.

12. An apparatus as claimed in claim 8, in which the signals indicative of conditions of the surrounding pixels represent the image signal by binary codes each having a plurality of bits, the random noise compensation being carried out based on the MSB's of said signals associated with the surrounding pixels.

13. An apparatus as claimed in claim 12, in which each of the signals indicative of conditions of the surrounding pixels is provided with four bits.

14. An apparatus as claimed in claim 12 or 13, in which OR of the MSB's of the signals associated with conditions of the surrounding pixels is obtained and, then, AND of the OR and the MTF compensated signal associated with the object pixel is obtained.

* * * * *